United States Patent [19]

Jung et al.

[11] Patent Number: 5,046,811
[45] Date of Patent: Sep. 10, 1991

[54] JUNCTION BOX FOR OPTICAL COMMUNICATIONS CORDS, AND GLAND ASSEMBLY FOR CORD

[76] Inventors: Roger E. Jung, 38 Tufton Road, Chingford, London E4 8LE; Edward K. George, 93 Nelson Road, Rainham, Essex, RM13 8AP, both of England

[21] Appl. No.: 534,558

[22] Filed: Jun. 7, 1990

[30] Foreign Application Priority Data

Jul. 17, 1989 [GB] United Kingdom ............... 8916333

[51] Int. Cl.5 .............................................. G02B 6/36
[52] U.S. Cl. ....................................... 385/15; 385/135
[58] Field of Search ............... 350/96.20, 96.21, 96.22

[56] References Cited

U.S. PATENT DOCUMENTS 4,765,709  8/1988  Suillerot et al. ............ 350/96.21 X
4,914,261  4/1990  Tokumaru et al. .......... 350/96.20 X
4,932,744  6/1990  Messelhi ........................ 350/96.20

FOREIGN PATENT DOCUMENTS 0043570  1/1982  Fed. Rep. of Germany ... 350/96.20
2517097  5/1983  France ............................ 350/96.23
2165661  4/1986  United Kingdom .

*Primary Examiner*—William L. Sikes
*Assistant Examiner*—Phan T. Heartney
*Attorney, Agent, or Firm*—Kirschstein, Ottinger, Israel & Schiffmiller

[57] ABSTRACT

A junction box for linking a first optical communications cord with two or more second optical communications cords, includes a sealable, flat housing having internal formations for organizing optical fibres; terminals, preferably glands, along one edge of the housing for connection to the first and/or second optical communications cords; passive optical components including a 1×2 fiber-optic coupler all interconnected by internal optical fibres with the terminals, the internal fibres all being organized together in a single loop parallel to the major faces of the housing; and clamps along the inside of at least one different edge of the housing between the loop and the edge wall of the housing, retaining the passive optical components.

7 Claims, 2 Drawing Sheets

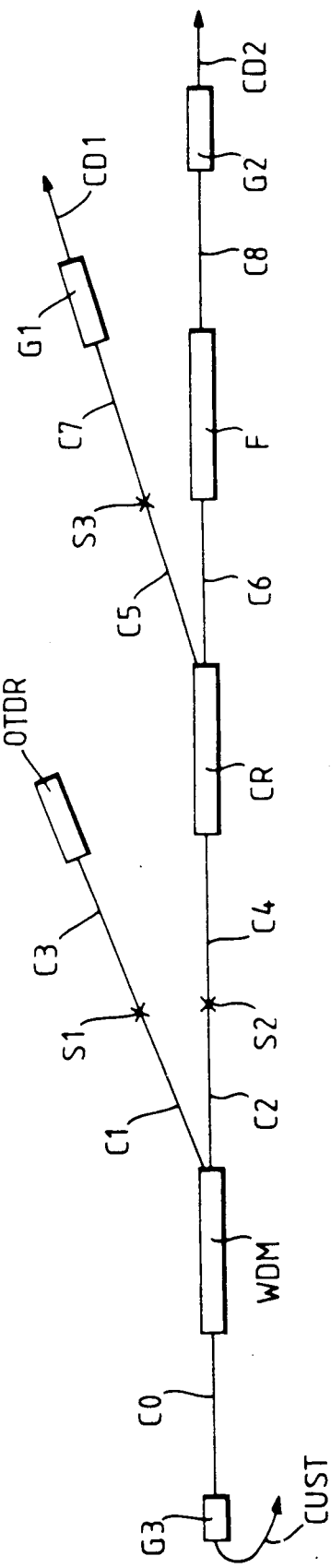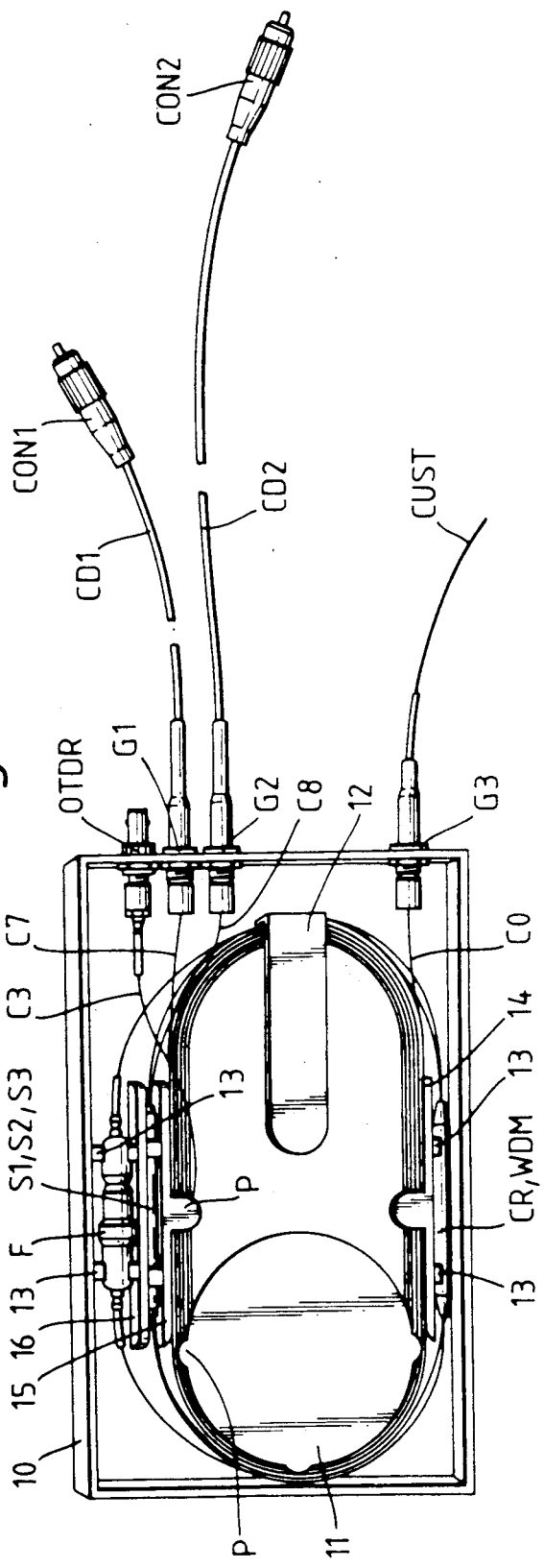

JUNCTION BOX FOR OPTICAL COMMUNICATIONS CORDS, AND GLAND ASSEMBLY FOR CORD

BACKGROUND OF THE INVENTION

1. Field of the Invention

One invention relates to a junction box for linking a first optical communications cord with two or more second optical communications cords, such as is required in telephone subscribers' premises and in exchanges. A second, related invention concerns gland assemblies for optical cords entering such a junction box.

SUMMARY OF THE INVENTION

The purpose of the first invention is to provide such a junction box which is capable of retaining safely inside the box the passive optical components, such as couplers and filters, and organising efficiently the interconnecting optical fibers; hitherto, the passive optical components have had to be attached externally of boxes containing the interconnecting optical fibres.

Accordingly, the first invention provides a junction box for linking a first optical communications cord with two or more second optical communications cords, comprising; a sealable, flat housing having internal formations for organising optical fibres, terminals along one edge of the housing for connection to the first and/or the second optical communications cords; passive optical components including a 1×2 fibre-optic coupler all interconnected by internal optical fibres with the terminals, the internal fibres all being organised together in a single loop parallel to the major faces of the housing; and clamps along the inside of at least one different edge of the housing between the loop and the edge wall of the housing, retaining the passive optical components. Usually, at least one of the internal fibres is spliced along its length and the splice is retained in one of the edge clamps.

Preferably, the clamps are along two parallel edges of the housing so that all the passive optical components and any splices are parallel to each other.

Conveniently also, the internal formations comprise an accumulator extending in the plane of the loop from the outside to the centre of the loop. This is useful during the initial organising of the fibres within the box, and of course assists in retaining fibres which have become shorter as a result of splicing during subsequent servicing.

In order to isolate the components from shock, the clamps preferably include resiliently deformable pads between which the passive optical components are retained.

The housing is conveniently manufactured as a two-piece plastics moulding, one part of which is preferably integral with the internal formations and preferably also the clamps.

The optical fibres of the first and/or second optical communications cords preferably extend through the wall of the box, and the terminals are preferably glands which support the cords at the wall. The external cord has a protective sheath, forming a rugged connector, and in this case the sheath is stripped off the portion within the housing.

It is the purpose of the second invention to provide a gland assembly which performs this task. Accordingly, the second invention provides a gland assembly for an optical cord having an optical fibre core, a sheath, and an intermediate layer of non-metallic strength members, the assembly comprising: a tube having external formations for connecting it to a body through which it extends; and a tubular end cap with an apertured base for the passage of the optical fibre core; there being an annular clearance space between the cylindrical inner wall of the end cap and the outer wall of one end of the tube just sufficient to trap therebetween the evenly-spaced strength members bent back from the end of the optical cord held within the tube. The gland assembly may conveniently be pre-connected to the cord before assembly in the junction box.

Preferably, the external formations comprise screw-threading adjacent an annular shoulder, the assembly further comprising a nut in screw-threaded engagement with the tube, for clamping between the nut and the shoulder the annular edge of a circular-apertured body.

Advantageously also, the tube and the end cap have co-operating surface formations such that they are a snap fit when trapping the strength members of the optical cord. There is preferably a tightly-fitting sleeve over part of the tube and the optical cord, and preferably the sleeve is heat-shrunk.

The end cap may be adhered to the tube using a suitable adhesive such as an epoxy resin which allows sufficient time during assembly before it hardens.

BRIEF DESCRIPTION OF THE DRAWINGS

A junction box embodying the first invention and incorporating glands embodying the second invention will now be described by way of example, with reference to the accompanying drawings, in which:

FIG. 1 is a diagram of the optical components and sleeved fibres contained in the junction box housing;

FIG. 2 is a top perspective view of the junction box with its lid removed;

DETAILED DESCRIPTION OF THE PREFERRED EMBODIMENTS

Figure 3:
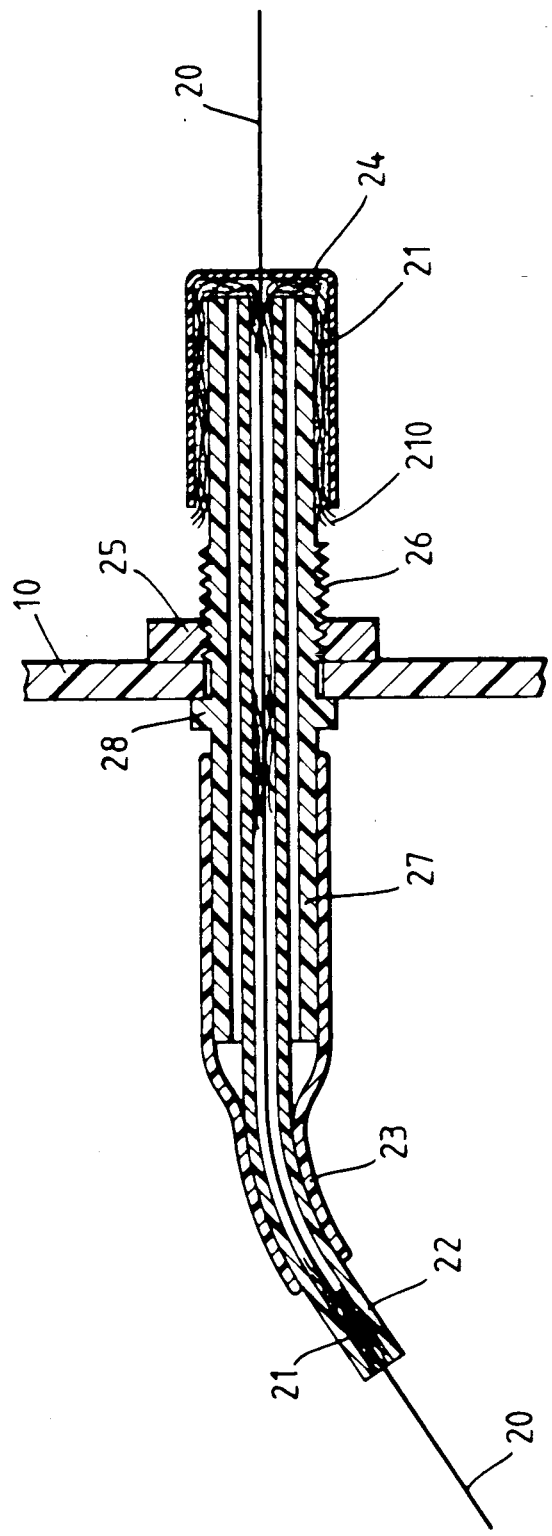
FIG. 3 is a longitudinal section on the axis of one of the glands of the junction box.

With reference to FIGS. 1 and 2, an optical fibre cord "CUST" in the form of a sleeved optical fibre from a telephone subscriber's premises is connected by the junction box to two networks for transmissions at different wavelengths, for example 130 nm and 155 nm, by way of reinforced optical connector cords CD1 and CD2 respectively terminated with connectors CON1 and CON2. In this preferred example, it is also connected to an OTDR (optical time domain reflector) terminal "OTDR" mounted on the junction box.

The subscriber's cord CUST enters the junction box through a gland 63 and continues as a sleeved fibre CO to a wavelength division multiplexer WDM which connects it to two sleeved fibres C1, C2. Fibres C1 and C2 are spliced at S1 and S2 to respective sleeved fibres C3 and C4 connected to the OTDR terminal and to a 1×2 coupler CR respectively. The coupler CR connected fibre C4 with sleeved fibres C5 and C6; fibre C5 is spliced at S3 to sleeved fibre C7 which is a continuation of the core of the external cord CD1 supported by gland G1. Fibre C6 is connected to a filter F; this is connected to sleeved fibre C8 which is a continuation of the core of the other external cord CD2, supported by gland G2.

Each internal fibre C0 to C8 is chosen deliberately to have the same length, in this example 1.5 m, to facilitate its organisation within the junction box.

The junction box comprises a flat, sealable rectangular housing 10 which is a plastics injection moulding in two parts: the base and side walls as shown, and a plain lid (not shown) secured by clips. Integrally moulded with the major part of the housing 10 are projections P and an accumulator 12 in a plane parallel to the major faces of the housing, and three upstanding clamps 14, 15 and 16 for the splices and the passive optical components, i.e. the multiplexer WDM, the 1×2 coupler CR and the filter F.

The three glands G1, G2 and G3, and the OTDR terminal, are all situated in line along the same side wall of the housing. However, in an alternative example (not shown), the sleeved fibre C0 exits the box through a slot in the lid, and there is not gland G3; the continuation CUST of this optical fibre outside the box has suitable oversleeving for protection, and some clamping means for preventing the internal fibre C0 from being pulled. In this alternative, the box is supplied with excess cord (CUST) coiled on a drum around other formations on the external surface of the lid, and a fision splice protection package conveniently secured on the lid for subsequent use during installation.

The passive optical components CR, WDM and F and the three splices S1, S2 and S3 are arranged mutually parallel along the inside of opposite edges of the housing 10, between the clamp 14 and one side wall, between the clamps 15 and 16, and between the clamp 16 and the other side wall. Resiliently deformable foam pads 13 assist in retaining these compounds while protecting them from shock; the components are a push fit, facilitating assembly of the box.

The internal fibres C0 to C8 are all coiled together in a common, oval loop, between the clamps 14 and 15 and the end walls. This is possible because they have a common length. The organisation of the fibres into a loop is important because they do not tolerate bending to a radius of curvature less than 40 mm. Each sleeved fibre comprises an optical fibre with a PTFE or other polymer sleeving which has a memory for a straight configuration, so that it springs back to a straight line when released, and it is resiliently biased against the various constraints within the housing when coiled, to assist in its retention in the housing.

The loop passes around a drum 11 and under the projections P and the accumulator 12.

Figure 4:
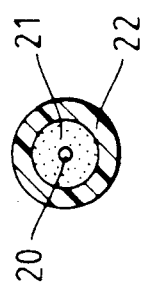
FIG. 4 is a cross-section, to an enlarged scale, through the reinforced optical cord attached to the gland of FIG. 3.

One of the glands G1, G2, G3 is shown in greater detail in FIG. 3, and the reinforced external cord CD1, CD2 in cross-section in FIG. 4. The cord comprises a sleeved optical fibre 20 surrounded by a layer 21 of non-metallic strength members of Kevlar (Registered Trade Mark) polymeric fibre, and an outer plastics sheath 22. The diameter of the sleeve is 1 mm and that of the fiber is 250 microns. The gland comprises a tubular body 27, a nut 25, a heat-shrunk sleeve 23 and an end cap 24, and is secured through an aperture in the wall of the housing 10. An annular shoulder 28 on the body 27 bears against the wall 10 from one side, while the nut 25, in screw-threaded engagement with the body 27, bears against it from the other side. The cord, partially stripped of its sheath 22 and strength member fibres 21, is pushed through the tubular body 27 so that the end of the sheath 22 is flush with the end of the body 27, and it is sealed in place by means of the heat-shrink sleeve 23. An excess length 210 of the layer 21 of strength members, commensurate with the length of the end cap 24, is bent back outside the body 27, spread evenly around it, and is trapped thereby by pushing the end cap 24 over the end of the body 27. The sleeve optical fibre 20 extends through an aperture in the base of the end cap 24.

In the example shown, an epoxy resin is used to secure the end cap to the cylindrical outer surface of the body 27 and to seal the termination. Alternatively, or in addition, co-operating projections (not shown) on the end cap 24 and body 27 ensure a snap fit, facilitating assembly.

We claim:

1. A junction box for linking a first optical communications cord with a plurality of second optical communications cords, each cord having an optical fiber core, a sheath and an intermediate layer of non-metallic strength members, the junction box comprising: a sealable, generally flattened housing having walls, opposite major faces, and integrally molded internal formations for organizing internal optical fibers within the housing; a plurality of terminals along one wall of the housing for connection to at least one of said second cords; a plurality of passive optical components, including a 1×2 fiber-optic coupler, all interconnected by the internal fibers with said terminals, at least one of said internal fibers having a splice along its length, and the internal fibers all being organized together in a single loop lying generally parallel to the major faces of the housing and having a curvature, the internal fibers of the loop being resiliently biased against the curvature of the loop; and a plurality of clamps for retaining the passive optical components within the housing, said clamps extending along two parallel walls of the housing so that all the passive optical components and the splice of said at least one internal fiber extend generally parallel to one another, said clamps including resiliently deformable pads between which the passive optical components are retained; each terminal including a gland assembly for a respective cord, the gland assembly including a hollow tube through which the respective cord extends, said tube having an outer wall and external formations for connecting the tube to the housing through which the tube extends, and a tubular end cap having an inner wall and an apertured base for the passage of the core of the respective cord, said outer wall of the tube bounding an annular clearance space with the inner wall of the end cap, said strength members of the respective cord within the tube being routed exteriorly of the tube through the annular clearance space for entrapment therein when the end cap is mounted on the tube.

2. A junction box according to claim 1, wherein the external formations comprise a threaded section adjacent an annular shoulder on the tube, the assembly further comprising a nut in threaded engagement with the threaded section.

3. A junction box according to claim 2, wherein the tube and the end cap have cooperating surface formations that are a snap fit when the end cap is mounted on the tube.

4. A junction box according to claim 1, wherein the assembly further comprises a tightly-fitting sleeve over part of the tube and the respective cord.

5. A junction box according to claim 4, wherein the sleeve is constituted of a heat-shrinkable material.

6. A junction box according to claim 1, wherein the end cap is adhered to the tube.

7. A junction box according to claim 1, wherein all the internal fibers in the loop have the same length.

* * * * *